(12) United States Patent
Zetterlund (10) Patent No.: US 8,266,299 B2
(45) Date of Patent: Sep. 11, 2012

(54) METHOD FOR ESTABLISHING A LOCAL MEDIA CONNECTION IN A COMMUNICATION SYSTEM

(75) Inventor: Jerker Mattias Zetterlund, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 12/808,523

(22) PCT Filed: Dec. 20, 2007

(86) PCT No.: PCT/SE2007/051056
§ 371 (c)(1),
(2), (4) Date: Apr. 14, 2011

(87) PCT Pub. No.: WO2009/082297
PCT Pub. Date: Jul. 2, 2009

(65) Prior Publication Data
US 2011/0185069 A1    Jul. 28, 2011

(51) Int. Cl.
*G06F 15/16* (2006.01)
(52) U.S. Cl. ........................ 709/227
(58) Field of Classification Search ............ 709/227
See application file for complete search history.

(56) References Cited

U.S. PATENT DOCUMENTS

| | | | |
|---|---|---|---|
| 8,015,294 B2 * | 9/2011 | Bugenhagen et al. | 709/227 |
| 2007/0019619 A1 | 1/2007 | Foster et al. | |
| 2007/0121596 A1 * | 5/2007 | Kurapati et al. | 370/356 |
| 2007/0155386 A1 * | 7/2007 | Wahl et al. | 455/436 |
| 2007/0171895 A1 * | 7/2007 | Oberle et al. | 370/352 |
| 2007/0201473 A1 | 8/2007 | Bhatia et al. | |
| 2007/0206735 A1 * | 9/2007 | Silver et al. | 379/88.19 |
| 2008/0025320 A1 * | 1/2008 | Bangalore et al. | 370/395.52 |
| 2008/0037518 A1 * | 2/2008 | Kumarasamy et al. | 370/352 |
| 2008/0056151 A1 * | 3/2008 | Gazier et al. | 370/252 |
| 2008/0170677 A1 * | 7/2008 | Kutt et al. | 379/142.04 |
| 2008/0285544 A1 * | 11/2008 | Qiu et al. | 370/352 |
| 2008/0317011 A1 * | 12/2008 | Datta et al. | 370/356 |

* cited by examiner

*Primary Examiner* — Wing Chan
*Assistant Examiner* — Alicia Baturay (57) ABSTRACT

The present invention relates to a method for deciding, in an IP-based communication system, whether a local media/media release is allowed between a first and at least a second terminal. The method is characterized in that the decision is based on information established by an application server in an multimedia core network. The present invention further also relates to a session border controller unit, a session border controller, an application server and a computer program product for performing said method.

10 Claims, 4 Drawing Sheets

METHOD FOR ESTABLISHING A LOCAL MEDIA CONNECTION IN A COMMUNICATION SYSTEM

TECHNICAL FIELD

The present invention relates in general to a method for establishing a local media connection in a telephone communication system, and in particular to a method for deciding whether or not a local media connection should be used between two terminals in a telephone communication system.

The present invention further relates to a session border controller unit, a session border controller, an application server, a multimedia core network and a computer program product.

BACKGROUND

Within an IP based communication system comprising an access network to an external IP based communication network, such as, for example, the Internet or IMS (IP Multimedia Subsystem), Session Border Controllers (SBC) are usually located in between the access network and IP based communication core networks. The SBCs are arranged to provide access and interconnections for terminals in the access network to the IP-based communication core networks. The SBCs may also, by creating terminations or anchoring points in a media proxy for a call between two terminals, provide operators with the ability to monitor various call parameters, such as, for example, call length, call services etc.

However, SBCs may further be arranged to refrain from anchoring media plane traffic in the SBCs between two terminals. This allows the media plane traffic of the call to float directly between the two terminals in the access network. This functionality in a telephone communications system may be referred to as local media or media release connection.

A local media or media release connection between two terminals may be used, for example, in company internal networks or other organizational structures, in order to achieve a more efficient usage of available bandwidth. It may also be used to avoid occupying unnecessary resources by having media plane streams from the access network also running through other network nodes in the IP based communications core network.

This may also be referred to as hair pinning or anchoring media streams of the access network in the IP based communications core network.

Before establishing a local media or media release connection between two terminals in the access network, the SBCs must independently make a decision whether or not a local media or media release connection is allowed between the calling terminal and the called terminal. Therefore, the SBCs must be configured and updated with user information about which terminals in the access network that are allowed to communicate with each other using a local media or media release connection.

This provides SBCs with a high degree of complexity. It also makes updating and adding to the user configuration information a time-consuming and arduous task. In the case of multiple SBCs, it also follows that each of the SBCs has to be individually programmed with the user configuration information.

SUMMARY

A problem to which the present invention relates is the problem of reducing the complexity of a network node in a session border controller that allows local media or media release connection in a communication system.

This problem is addressed by a method for deciding whether a local media connection should be established in an access network of an IP-based communication system between a first and at least a second terminal located within said access network, wherein said access network is connected to a session border controller providing access to an multimedia core network, characterized in that said decision is made by said session border controller based on information established by and received from an application server in said multimedia core network.

By having the user configuration in an application server, a significant part of the complexity of the networks nodes in the session border controller is removed, and allows the session border controller to be focused more on its dedicated tasks. The application server of an multimedia core network is arranged to provide operators with the possibility to easily handle users and user group information, and is therefore provides a more suitable and flexible solution for allowing a local media or media release connection in an access network.

An advantage of the above described invention, besides solving the problem addressed above, is that it enables system operators and administrators to provide a more flexible and easier local media service for its customers.

A further advantage of the above described invention is that it enables a local media or media release between two terminals, wherein at least one of the terminals is located in a visited network.

The method may further include having a session border controller unit that, if the message from said application server indicates that a local media connection is allowed between said first and at least second terminal, establishes a local media connection between said first and at least second terminal.

The method may further include having a session border controller unit that, if the message from said application server indicates that a local media connection is not allowed between said first and at least second terminal, establishes a communication channel between said first and at least second terminal anchored in a media proxy in said session border controller.

A further advantage of the above described invention is that it reduces the use of system resources in the core networks of a communication system, by making it possible for an operator to more frequently and simpler perform updates of the user configuration information. Since more local media connections then may be established in the access network the present invention also reduces delay and packet loss in a communication system.

The object of the present invention is further achieved by a session border controller unit for deciding whether a local media connection should be established in an access network of an IP-based communication system between a first and at least a second terminal located within said access network, wherein said session border controller is connected to said access network and an multimedia core network, characterized in being arranged to make said decision based on information established by and received from an application server in said multimedia core network.

The object of the present invention is also achieved by a session border controller comprising a session border controller unit according to the above.

The object of the present invention is also achieved by an application server in a multimedia core network, characterized in being arranged to process information in order to establish whether a local media connection is allowed between a first and at least a second terminal in an access network of an IP-based communication system.

The object of the present invention is also achieved by an multimedia core network comprising an application server according to the above.

The object of the present invention is also achieved by a computer program product for use in a session border controller unit, which comprises computer readable code means, which when run in the session border controller unit, causes said session border controller unit, to make a decision whether a local media connection between a first and at least a second terminal should be established in an access network based on information established by and received from an application server in said multimedia core network.

Further advantageous embodiments of the method, the session border controller unit, the session border controller, the application server, the IMS network and the computer program product are set forth in the dependent claims, which correspondingly describe further advantageous embodiments of the present invention.

BRIEF DESCRIPTION OF THE DRAWINGS

The features, objects, and further advantages of the present invention will become apparent by reading this description in conjunction with the accompanying drawings, in which like reference numerals refer to like elements and in which.

DETAILED DESCRIPTION

Figure 1:
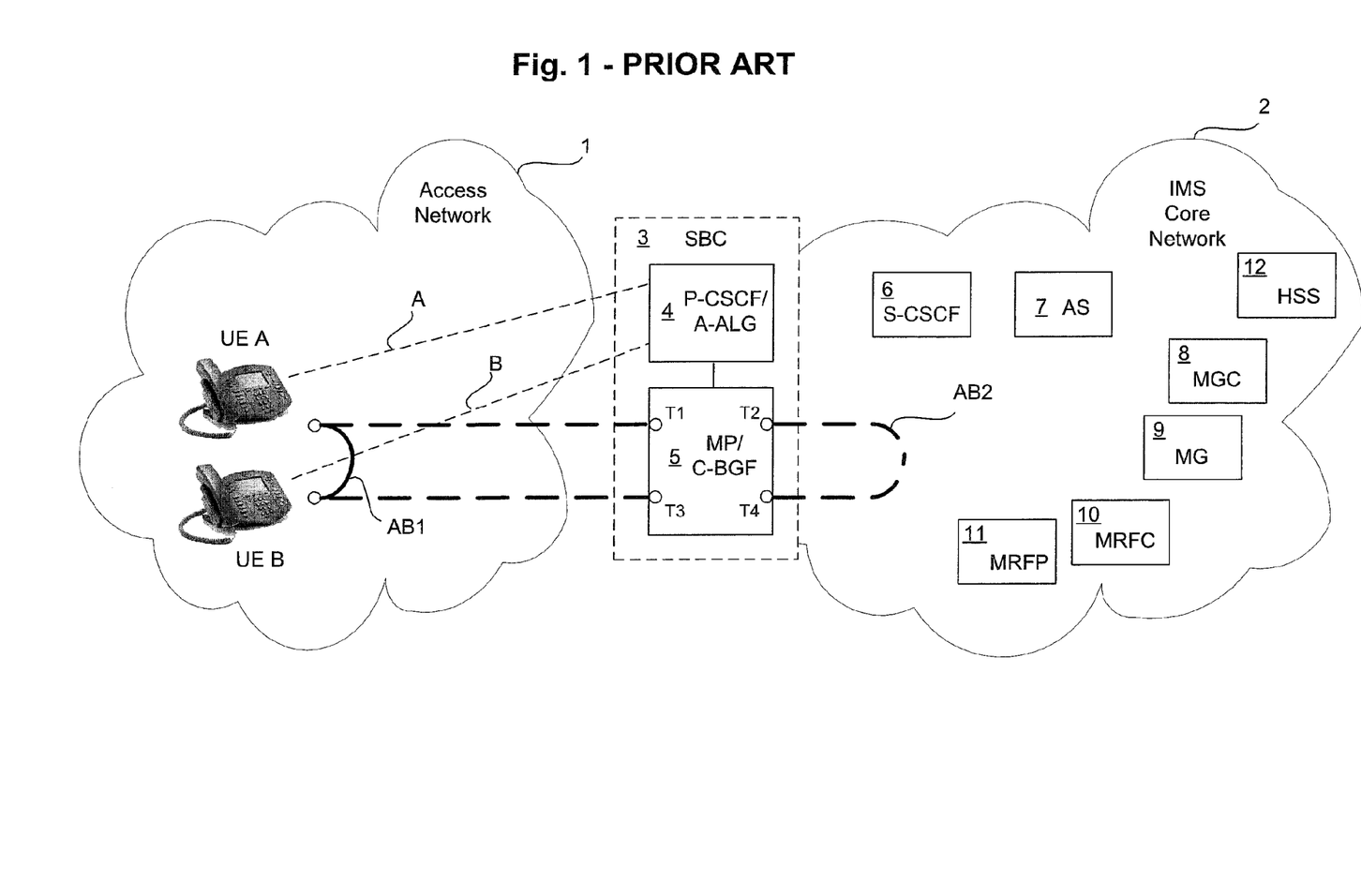
FIG. 1 is a block diagram illustrating an IP based communication system according to prior art.

FIG. 1 illustrates an IP based communication system according to prior art. In the following the term IP based communication system will be used in reference to any communication system capable of communicating using the Internet Protocol (IP) such as, for example, transit networks (the Internet, Intranets, Local Area Networks (LANs), Wide Area Networks (WANs) and Frame Relay, ATM or X.25 based transit networks etc.) and/or mobile radio communication networks such as, for example, UTRAN (Universal Terrestrial Radio Access Network), GERAN (GSM/EDGE Radio Access network) and/or EPS/SAE (Evolved Packet System/System Architecture Evolution). The term terminal will be used to denote any communication terminal capable of communicating within such a communication system, or the like, using the Internet Protocol (IP), such as, for example, VoIP/SIP telephones, mobile terminals, laptops, desktop computers, palm pilots etc.

The term local media connection is hereinafter, in the description and subsequent claims, used to refer to local media or media release or the like.

In FIG. 1, the terminals UE A and UE B are located within an access network 1 of an IP based communications system. The access network 1 is arranged to communicate with a Session Border Controller (SBC) 3. The SBC 3 provides access and interconnections for terminals in the access network 1 to IP-based communication core networks, such as, multimedia core networks, and in this case, particularly to the IMS core network 2. The SBC 3 may comprise a Proxy Call Session Control Function (P-CSCF) 4 and a Media Proxy (MP) 5. The MP 5 may commonly also be referred to as a Core-Border Gateway Function (C-BGF). Although not shown in FIG. 1 or 2, a Service Policy Decision Function (SPDF) may also be located between the P-CSCF 4 and the MP 5 in the SBC 3. In the SBC 3, the signalling functions can occur on a separate hardware platform than the media relay functions, that is, the P-CSCF 4 may be separated from the MP 5 and physically be located elsewhere.

The IMS core network 2 in FIG. 1 illustrates a simplified example of an IMS core network architecture. In FIG. 1, the IMS core network 2 is shown comprising the network nodes, Serving Call Session Control Functions (S-CSCF) 6, Applications Servers (AS) 7, a Media Gateway Controller (MGC) 8, a Media Gateway (MG) 9, a Media Resource Function Controller (MRFC) 10, a Media Resource Function Processor (MRFP) 11 and Home Subscriber Service (HSS) 12. It should be noted that the IMS core network 2 may also be said to comprise further nodes and entities, but is for the sake of simplicity and relevance to the present invention not described in further detail herein. More information about IMS, the IMS standards and the different types of nodes available therein can be found in, for example, the TISPAN specifications ETSI ES 282.007 and ETSI ES 283.003, and the 3GPP specification TS 23.002. Another specification relevant to the present invention is the TISPAN specification ETSI ES 282.003.

According to prior art, as the terminal UE A attempts a call to the terminal UE B, a SIP (Session Initiation Protocol) invite message with an SDP (Session Description Protocol) offer will be sent from the terminal UE A to a P-CSCF 4 in the SBC 3 through the control plane path A. It should be noted that the P-CSCF 4 in the SBC 3 may also be an Access Application Level Gateway (A-ALG), whereby the P-CSCF 4 then may be located in the IMS core network 2. However, the A-ALG may implement parts of the P-CSCF 4 as well as other functions in order to, for example, protect and support the IMS core network 4.

The P-CSCF 4 will as it receives the SIP invite message from the terminal UE A anchor the call in the MP 5, by ordering the MPS to add the terminations or anchoring points T1 and T2 for the call. Anchoring the call in the MP 5 may be performed in order to prepare for the cases where a local media connection is not allowed between the terminals UE A and UE B. The P-CSCF may forward the SIP invite message to other relevant nodes in the IMS core network 2, which may anchor the call in relevant media plane nodes. Anchoring the call in the relevant media plane nodes is also performed in order to prepare for the case where a local media connection is not allowed between the terminals UE A and UE B.

The P-CSCF 4 will then, based on user configuration information configured in the P-CSCF 4, make a decision whether or not to allow a communication channel or media signalling path AB1 using a local media connection to be established between the terminals UE A and UE B in the access network 1.

If the user configuration information configured in the P-CSCF 4 and/or an internal database does not allow a local media connection AB1, the P-CSCF 4 will further anchor the call in the MP 5 by adding the terminations or anchoring points T3 and T4. The communication channel, or media signalling path, between the terminals UE A and UE B will then be set up according to the dashed line AB2 in FIG. 1.

However, should the user configuration information in the P-CSCF 4 allow a local media connection between the terminals UE A and UE B, the P-CSCF 4 will send an SIP invite message to the terminal UE B through the control plane path B. The P-CSCF 4 will later also order the MP 5 to subtract the terminations or anchoring points T1 and T2. A communication channel AB1 using a local media connection between the terminal UE A and UE B in the access network 1 may then be established.

It should also be noted, however, that if nodes in the IMS core network 2 previously has anchored the call in a media plane node or nodes, this may be detected by the P-CSCF 4 which may then decide to not apply a local media connection between the terminal UE A and UE B in the access network 1.

In order to use the user configuration information located in the P-CSCF 4, and/or the A-ALG, for setting up a local media connection AB1 requires that the user configuration information frequently has to be updated. The user configuration information may, for example, comprise company employees between which a company may wish to allow local media connection usage of the company's network bandwidth. However, the task of updating and/or adding to the user configuration information is a time-consuming and complex task. In the case of multiple SBCs, it also follows that each of the SBCs has to be individually programmed with the user configuration information. This also makes it very difficult to allow a local media connection between terminals not sharing the same SBC. It further also provides SBCs with a high degree of complexity.

According to the inventive features of the present invention, these issues are addressed in a communication system by SBC and IMS network nodes of which exemplary embodiments are presented in the following. The SBC and IMS network nodes coordinate user configuration information regarding a local media connection between SBC and IMS network nodes, reduce the complexity of the SBC, reduce the use of system resources in the networks, as well as, allow each network node to focus on its dedicated tasks.

Figure 2:
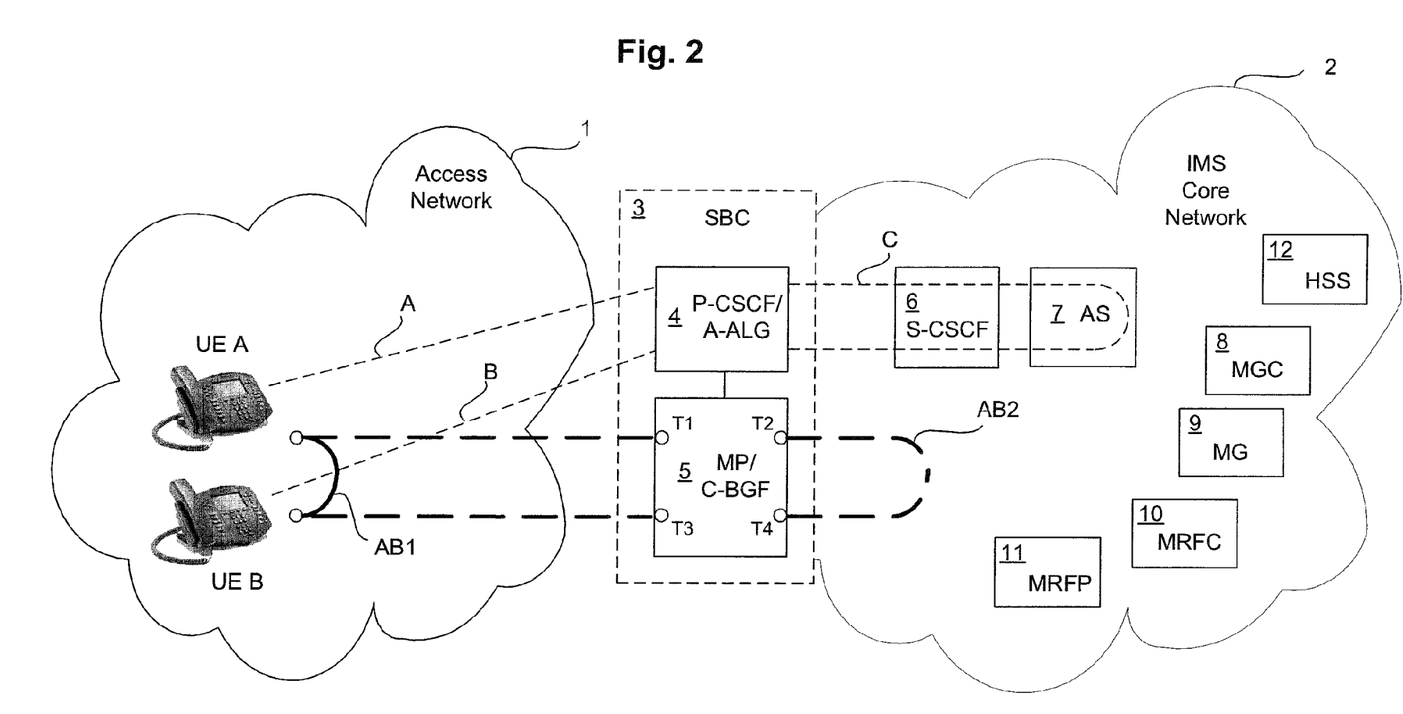
FIG. 2 is a block diagram illustrating an IP based communication system according to the present invention.

FIG. 2 illustrates an IP based communication system comprising network nodes arranged with the inventive features of the present invention. The terminals UE A and UE B are located within an access network 1 of an IP based communication system. The access network 1 is arranged to communicate with a Session Border Controller (SBC) 3. However, the inner structure and details of the access network 1 of the IP based communication system is not relevant to the object of the present invention. Therefore, no further description of the access network 1 is considered necessary in describing the inventive features of the present invention.

The IMS core network 2 in FIG. 2 comprises essentially the same nodes as illustrated in the simplified example of the IMS core network architecture in FIG. 1. Although, it should be noted that for sake of simplicity and relevance to the purpose of the present invention only the inventive features of the nodes S-CSCF 6 and AS 7 will be discussed below in reference to the IMS core network 2.

The SBC 3 in FIG. 2 comprises essentially the same nodes as illustrated in reference to prior art in FIG. 1. However, the SBC 3 in FIG. 2 according to the present invention may be arranged to, instead of being configured with user configuration information as in prior art, send a message or request through the S-CSCF 6 to the AS 7 in the IMS core network 2 requesting to know whether or not a local media connection AB1 is allowed between a first terminal UE A and at least a second terminal UE B.

In IMS core networks, application servers are SIP entities that hosts and executes various services. The application servers may be configured with data related to a user, or be arranged to download or upload data related to a user stored in, for example, an HSS12. It is often the task of application servers to keep track of different user groups and the users belonging thereto. The application server AS 7 can therefore in accordance with the present invention be arranged with the user configuration information relating to a local media connection between users in the access network 1. It follows that the AS 7 may be arranged to, for example, upon request look up or check within its comprised user configuration information if a local media connection between two terminals is allowed. Alternatively, the AS 7 may be arranged to upon request upload the relevant user configuration information concerning a local media connection between two terminals from other network nodes, for example, the HSS12. The application server AS 7 provides a more efficient, flexible and simpler solution to allow a local media connection between a first UE A and at least a second terminal UE B in the access network 1. The AS 7 may be easily kept up-to-date by the operator, which no longer has to individually program each SBC. The AS 7 may also be a "business trunking" application server.

The AS 7 may further be arranged to insert a "local media" header in SIP messages. The "local media" header may inform a requesting network node, for example, the P-CSCF 4 in the SBC 3, about the local media connection status between two determined terminals in access networks. The local media connection status may for example indicate that a local media connection is allowed between a first and at least a second terminal, or that a local media connection is not allowed between a first and at least a second terminal. The "local media" header may, for example, be a flag set in the SIP message header or a new line in the SDP part of the SIP message. By standardizing and incorporating a "local media" header in the SIP signalling, application servers, ASs, and session border controllers, SBCs, from different vendors may be provided with the possibility to work together to apply a local media connection.

The S-CSCF 6 in the IMS core network 3 may be arranged to receive SIP messages that include "local media" headers from the AS 7 and the P-CSCF 4. If the terminal UE B is in the same network as the terminal UE A, the S-CSCF 6 may be arranged to forward SIP messages comprising "local media" headers to the AS 7 from the P-CSCF 4 in the SBC 3, and vice versa. However, if the terminal UE B is associated to another IMS core network or in, for example, another access network than the terminal UE A, the S-CSCF 6 may be arranged to forward SIP messages comprising "local media" headers to/from the P-CSCF currently associated with the terminal UE B. The P-CSCF currently associated with the terminal UE B may not be the same as the P-CSCF 4 associated with the terminal UE A.

As is illustrated by the control signal path C in FIG. 2, the present invention may coordinate user configuration information regarding a local media connection between the SBC 3 and nodes in the IMS core network 2. The control signal path C and the signalling that occurs between the SBC 3 and the nodes in the IMS core network 2 will be described in more detail in the following with reference to FIGS. 3 and 4.

Figure 3:
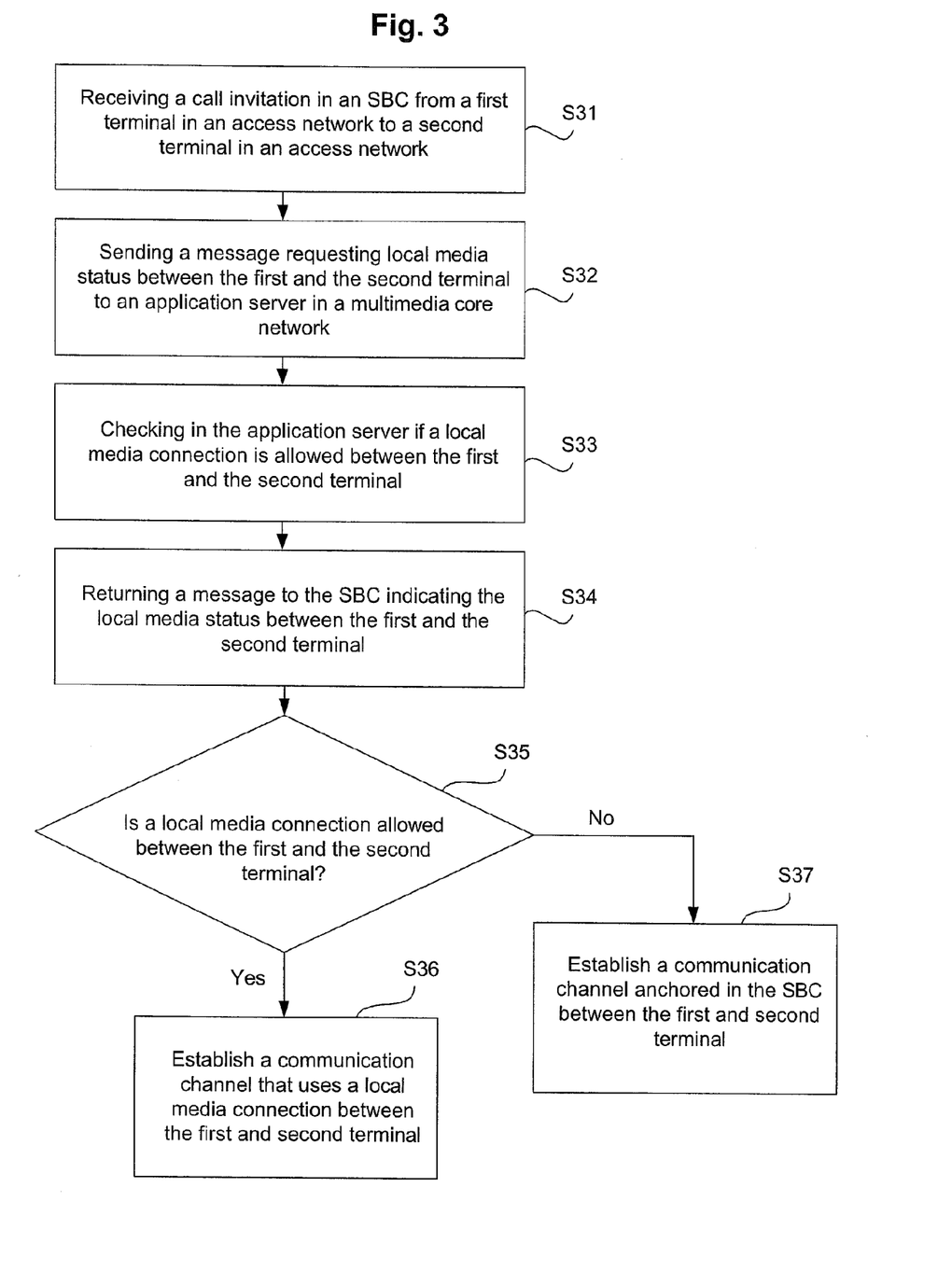
FIG. 3 is a flowchart illustrating an exemplary operation of a session border controller and network nodes according to the present invention.

FIG. 3 is a flowchart illustrating an exemplary operation of a session border controller, SBC 3, and network nodes, S-CSCF 6 and AS 7, according to the present invention. A first terminal, for example, the terminal UE A, in the access network 1 attempts a call to a second terminal, for example, the terminal UE B. The call may be an ordinary voice call or a multimedia call comprising both audio and video. The terminal UE B may be located in the same or in another access network 1. An invite, for example, a SIP invite message with an SDP offer, is then sent on the control plane from the first terminal UE A to the SBC 3. The invite is received by the SBC 3.

In step S31, the SBC 3 receives the invite from the first terminal UE A to the second terminal UE B. In step S32, since no user configuration information concerning a local media connection is configured in the SBC 3, the SBC 3 sends a message or request to an application server AS 7 in a multimedia core network, e.g. the IMS core network 2, requesting information regarding whether or not a local media connection is allowed between the first terminal UE A and the second terminal UE B. The AS 7 receives the message or request from the SBC 3.

In step S33, the AS 7 looks up or checks within its comprised or uploaded user configuration information if a local media connection is allowed between the first terminal UE A and the second terminal UE B. In step S34, the AS 7 returns a message to the SBC 3 indicating the local media connection status between the first terminal UE A and the second terminal UE B. The SBC 3 receives the message from the AS 7.

In step S35, the SBC 3 determines from the information comprised in the message from the AS 7 whether or not a local media connection is allowed between the first terminal UE A and the second terminal UE B. If a local media connection is allowed between the first terminal UE A and the second terminal UE B, the SBC 3 will in step S36 perform signalling that establishes a communication channel that uses a local media connection between the first terminal UE A and the second terminal UE B. Alternatively, if a local media connection is not allowed between the first terminal UE A and the second terminal UE B, the SBC 3 will in step S37 perform signalling that establishes an anchored communication channel between the first terminal LIE A and the second terminal UE B. The communication channel, or media signalling path, will then be set up according to the dashed line AB 2 in FIGS. 1 and 2 between the first terminal UE A and the second terminal UE B. Anchoring the communication channel in the SBC 3 forces the call media to pass through SBC 3 between the first terminal UE A and the second terminal UE B.

Figure 4:
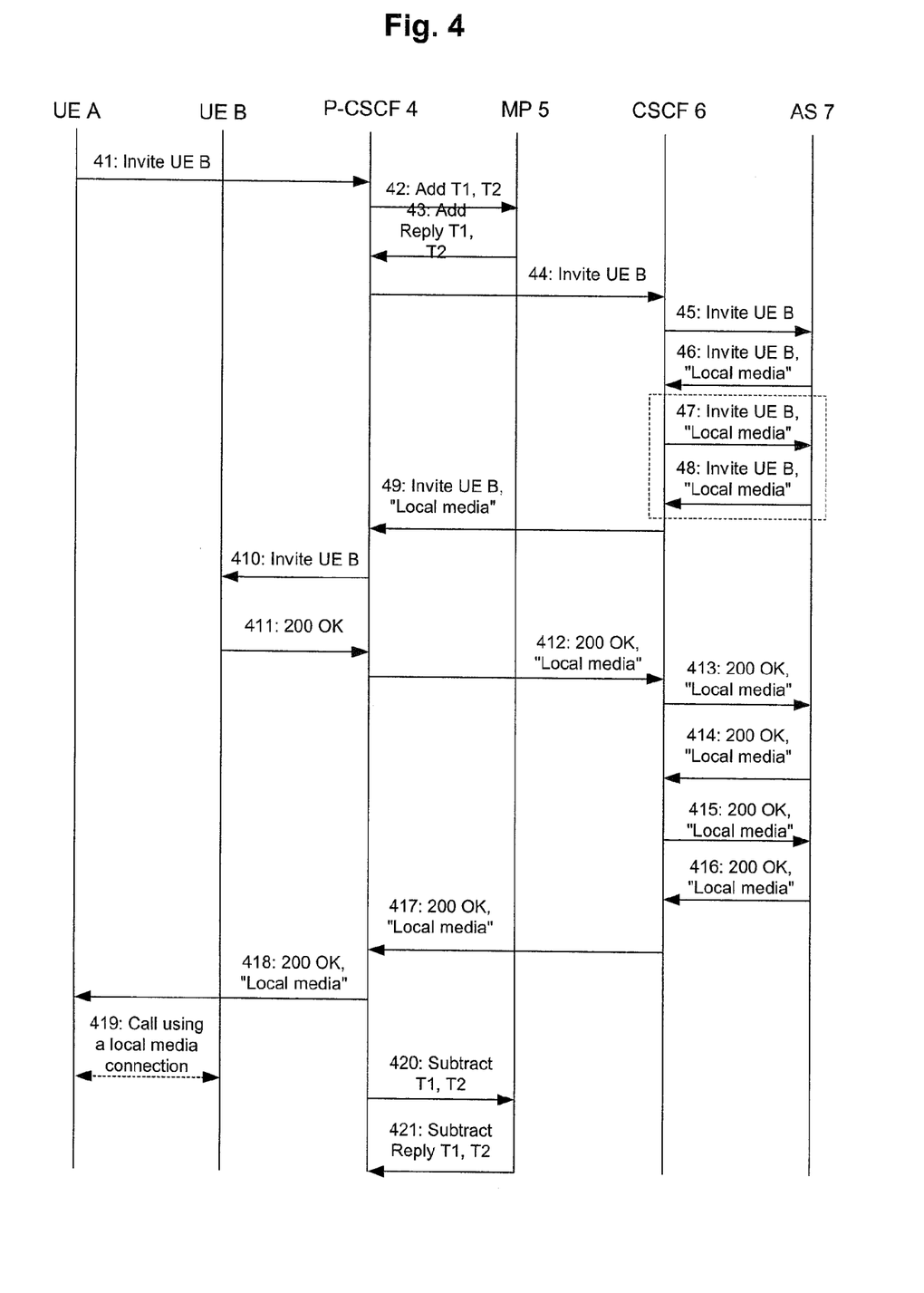
FIG. 4 is a signalling diagram illustrating in more detail the signalling between terminals, session border controller and network nodes according to an exemplary embodiment of the present invention.

FIG. 4 is a signalling diagram illustrating in more detail the signalling between terminals (UE A and UE B), session border controller units (P-CSCF 4 and MP 5), and IMS core network nodes (S-CSCF 6 and AS 7), according to an exemplary embodiment of the present invention.

The terminal UE A attempts a call to terminal UE B, whereby the terminal UE A sends a SIP invite message 41 with an SDP offer to the P-CSCF 4, or A-ALG, in the SBC 3. It should be noted that, in general and if nothing else is described, the offer/answer procedure of the SDP (Session Description Protocol) is adhered to in the signalling below. Information about SDP and the offer/answer procedure can be found in, for example, RFC 4566.

The P-CSCF 4 in the SBC 3 may order 42 the MP 5 to add the terminations or anchoring points T1 and T2 for the call. The termination T2 may also include a media address and port number (MPA). Anchoring the call in the MP 5 may be performed in order to prepare for the cases where a local media connection is not allowed between the terminals UE A and UE B. The MP 5 adds the terminations T1 and T2 and may then respond to the message 42 from the P-CSCF 4 with a reply message 43 informing the P-CSCF 4 that the terminations T1 and T2 has been added for the call. The P-CSCF 4 may then store, in an internal database, the media addresses and ports of each media stream in the SDP offer received in the SIP invite message 41 from the terminal UE A, together with the corresponding values of the MPA of the termination T2 and an outgoing session ID.

The P-CSCF 4 then sends a SIP invite message 44 to the S-CSCF 6 in the IMS core network 2. The S-CSCF 6 forwards the SIP invite message 45 to the application server AS 7 in the IMS core network 2. The AS 7, or other IMS core network nodes such as, for example, the MGC 8, may then anchor the call in the relevant media plane nodes in order to be able to provide media services, for example, in the case when a local media connection is not allowed between the terminals UE A and UE B.

As the AS 7 receives the SIP invite message 45, the AS 7 checks within its comprised or uploaded user configuration information if a local media connection is allowed between the terminals UE A and UE B. If a local media connection is allowed, the AS 7 may insert a local media header, indicted in FIG. 4 by "Local media", before sending the SIP message 46 back to the S-CSCF 6.

S-CSCF 6 sends SDP offer 47 back to AS 7. If the terminal UE B is currently served by the same P-CSCF 4, or A-ALG, as the terminal UE A, the SIP message 48-49 including the local media header may be forwarded back to the P-CSCF 4. However, in the case of the terminal UE B being associated with, for example, another IMS core network or another access network, the SIP message 47 including the local media header may be forwarded to the P-CSCF currently associated with the terminal UE B. The signalling messages 47-48 indicated by the area inside the dashed lines, may also be performed as part of the standard signalling between the core network nodes in the IMS core network 2.

The P-CSCF 4 inspects the received SIP message 49. If the SIP message 49 includes a local media header or a local media header indicates that a local media connection is allowed between the terminals UE A and UE B, the P-CSCF 4 may decide if a local media connection is to be established between the terminals UE A and UE B. The P-CSCF 4 may compare the media address and port number in the received SDP offer in the SIP message 49 with its outgoing SDP offers stored in the internal database of the P-CSCF 4. The P-CSCF 4 is then able to recreate the SDP offer it received in the SIP invite message 41 from the terminal UE A, since the outgoing and the received SDP offers are stored together in the internal database. The P-CSCF 4 may then, by using the stored SDP offers in the internal database, recreate the SDP offer it received in the SIP invite message 41 from the terminal UE A and send a SIP invite message 410 to the terminal UE B. However, the P-CSCF 4 does not include the local media header in the SIP message 410 in order not to disclose this information to the terminal UE B. This may be performed in order to not send unnecessary information to the terminal UE B, and for various security aspects. The P-CSCF 4 also does not order the MP 5 to add the terminations T3 and T4 for a terminating call leg, as it would have should a local media connection not be allowed between the terminals UE A and UE B.

It should also be noted that should the SIP message 49 not include a local media header, or include a local media header indicating that a local media connection is not allowed between the terminals UE A and UE B, the P-CSCF 4 will go ahead and anchor a communication channel for the call in the MP 5 in the SBC 3. This procedure is not shown in FIG. 4 since it is part of the prior art and therefore can be considered comprised in the already existing design base.

The terminal UE B may respond to the SIP invite message 410 with a 200 OK message 411 including an SDP answer.

Since a local media connection is to be applied, the P-CSCF 4 forwards the SDP answer unmodified in a 200 OK message 412 to the S-CSCF 6, but includes the local media header to indicate to the originating side, that is, the terminal UE A, that a local media connection is to be applied. In order to cater for possible forking scenarios, the P-CSCF 4 may also enter the SDP answer in its internal database.

S-CSCF 6 forwards the SDP answer in a 200 OK message 413 to the AS 7. The AS 7 then sends the SDP answer in a 200 OK message 414 back to the S-CSCF 6. The S-CSCF 6 returns the SDP answer in a 200 OK message 415 to the AS 7. The AS 7 then sends the SDP answer in a 200 OK message 416-417 to the P-CSCF 4, which receives the SDP answer for the originating side of the call. The signalling messages 413-417 is performed as part of the standard signalling between the core network nodes in the IMS core network 2.

The P-CSCF 4 receives the SDP answer in the 200 OK message 417 and checks if the local media header is included. By checking in its internal database, the P-CSCF 4 knows to which streams a local media connection shall be applied. The P-CSCF 4 then sends the SDP answer, from the terminal UE B, in the 200 OK message 418 to terminal UE A, which completes the offer/answer procedure between the terminals UE A and UE B. Thereby, the media call 419 is set up, and call media can now float along the local media connection path AB1 in FIG. 2.

Since a local media connection has been applied between the terminals UE A and UE B, the P-CSCF 4 may order 420 the MP 5 to release the unused terminations T1 and T2 for the originating side of the call, i.e. the originating call leg. The MP 5 may then subtract the terminations T1 and T2 and send back an acknowledgement 421 to the P-CSCF 4.

The present invention may by not having the SBCs configured with the user information reduce the complexity of a session border controller unit P-CSCF 4 (or A-ALG), in a session border controller (SBC 3). This since the configuration information that allows a local media connection in a communication system from the session border controller unit P-CSCF 4 (or A-ALG) is removed. Instead, by locating said configuration information in an application server AS 7, the task of updating and adding to the user configuration information is made much simpler for system operators and administrators. The present invention also removes the need to, in the case of multiple SBCs, individually program each of the SBCs with the user configuration information.

By performing the method of the present invention the use of system resources in the core networks of the communication system is reduced, since the configuration information is more easily kept up-to-date and therefore may allow more communication channels using a local media connection to be established.

The present invention does also include a computer program product for use in a session border controller unit 4, which comprises computer readable code means, which when run in the session border controller unit 4, causes said session border controller unit 4, to make a decision whether a local media connection AB1 between a first terminal UE A and at least a second terminal UE B should be established in an access network 1 based on information established by and received from an application server 7 in said multimedia core network 2.

The computer program product can also comprise computer readable code means, which when run in the session border controller unit 4 causes the session border controller unit 4 to, upon receiving a call invitation from said first terminal UE A to said second terminal UE B, forward information associated with said call invitation to said application server 7.

The computer program product can further comprise computer readable code means, which when run in the session border controller unit 4 causes the session border controller unit 4 to, if said information from said application server 7 indicates that a local media connection is allowed between said first terminal UE A and at least second terminal UE B, establish a local media connection AB1 between said first terminal UE A and at least second terminal UE B terminal.

The computer program product can also comprise computer-readable code means, which when run in the session border controller unit 4 causes the session border controller unit 4 to, if said information from said application server 7 indicates that a local media connection is not allowed between said first terminal UE A and at least second terminal UE B, establish a communication channel AB2 between said first terminal UE A and at least second terminal UE B anchored in the session border controller 3.

The code means for the computer program is stored on a readable storage medium.

The description above is of the best mode presently contemplated for practising the present invention. The description is not intended to be taken in a limiting sense, but is made merely for the purpose of describing the general principles of the invention. The scope of the present invention should only be ascertained with reference to the issued claims.

The invention claimed is:

1. A method for deciding whether a local media connection should be established in an access network of an IP-based communication system between a first terminal and at least a second terminal located within said access network, wherein said access network is connected to a session border controller (SBC) providing access to a multimedia core network, the method comprising the steps of:

receiving, in the session border controller, a call invitation from the first terminal to the at least second terminal;

sending, from the session border controller to an application server in a multimedia core network, a message requesting a local media status between the first terminal and the second terminal;

checking, by the application server, if a local media connection is allowed between the first terminal and the second terminal;

receiving, in the session border controller from the application server, a message indicating the local media status between the first terminal and the second terminal, and further indicating whether a local media connection is allowed between said first terminal and the second terminal;

if the message indicates that a local media connection is allowed, establishing, by the session border controller, a local media connection between said first terminal and at least the second terminal; and if the message indicates that a local media connection is not allowed, establishing, by the session border controller, a communication channel between said first terminal and at least the second terminal anchored in a media proxy in said session border controller.

2. The method according to claim 1, wherein said information is established by said application server based upon information associated with a call invitation from said first terminal to said second terminal, received from said session border controller unit.

3. A session border controller unit (SBC) for deciding whether a local media connection should be established in an access network of an IP-based communication system between a first terminal and at least a second terminal located with said access network, wherein said session border controller is connected to said access network and a multimedia core network, the session border controller comprising:

processing circuitry configured to receive, a call invitation from the first terminal to the at least second terminal;

the processing circuitry further configured to send to an application server in a multimedia core network, a message requesting a local media status between the first terminal and the second terminal; and the processing circuitry further configured to receive from the application server, a message indicating the local media status between the first terminal and the second terminal, after the application server has checked if a local media connection is allowed between the first and second terminal, and further indicating whether a local media connection is allowed between said first terminal and the second terminal;

if the message indicates that a local media connection is allowed, the processing circuitry configured to establish a local media connection between said first terminal and at least the second terminal; and if the message indicates that a local media connection is not allowed, the processing circuitry configured to establish a communication channel between said first terminal and at least the second terminal anchored in a media proxy in said session border controller.

4. The session border controller unit according to claim 3, further being arranged to, upon receiving a call invitation from said first terminal to said second terminal, forward information associated with said call invitation to said application server.

5. An application server in a multimedia core network, being arranged to process information in order to establish whether a local media connection is allowed between a first terminal and at least a second terminal in an access network of an IP-based communication system, the application server comprising:

processing circuitry configured to receive, from a session border controller, a message requesting a local media status between the first terminal and the second terminal, wherein the message is received in response to the session border controller receiving a call invitation from the first terminal to the at least second terminal;

the processing circuitry further configured to check if a local media connection is allowed between the first terminal and the second terminal; and the processing circuitry further configured to send, to the session border controller, a message indicating the local media status between the first terminal and the second terminal, and further indicating whether a local media connection is allowed between said first terminal and the second terminal;

wherein, if the message indicates that a local media connection is allowed, the session border controller establishes a local media connection between said first terminal and at least the second terminal; and wherein, if the message indicates that a local media connection is not allowed, the session border controller establishes a communication channel between said first terminal and at least the second terminal anchored in a media proxy in said session border controller.

6. The application server according to claim 5, wherein said information is information associated with a call invitation from said first terminal to said second terminal.

7. The application server according to claim 6, wherein said information associated with the call invitation from said first terminal to said second terminal, is received from a session border controller unit.

8. The application server according to claim 5, further being arranged to retrieve information regarding whether a local media connection is allowed between a first terminal and at least a second terminal, from other multimedia core network nodes or external content servers.

9. The application server according to claim 5, further being arranged to include information regarding whether a local media connection is allowed between a first terminal and at least a second terminal, in a message to a session border controller unit.

10. The application server according to claim 9, wherein said information may be included in the message by using a local media header comprising a set flag.

* * * * *

UNITED STATES PATENT AND TRADEMARK OFFICE
CERTIFICATE OF CORRECTION

| | | |
|---|---|---|
| PATENT NO. | : 8,266,299 B2 | |
| APPLICATION NO. | : 12/808523 | |
| DATED | : September 11, 2012 | |
| INVENTOR(S) | : Zetterlund | |

It is certified that error appears in the above-identified patent and that said Letters Patent is hereby corrected as shown below:

In Column 4, Line 43, delete "MPS" and insert -- MP 5 --, therefor.

In Column 7, Line 33, delete "LIE" and insert -- UE --, therefor.

Signed and Sealed this
Twenty-seventh Day of November, 2012

David J. Kappos
*Director of the United States Patent and Trademark Office*